May 15, 1934.  K. E. McCONNAUGHAY  1,959,002
APPARATUS FOR PRODUCING PAVING MATERIAL
Filed Dec. 26, 1930
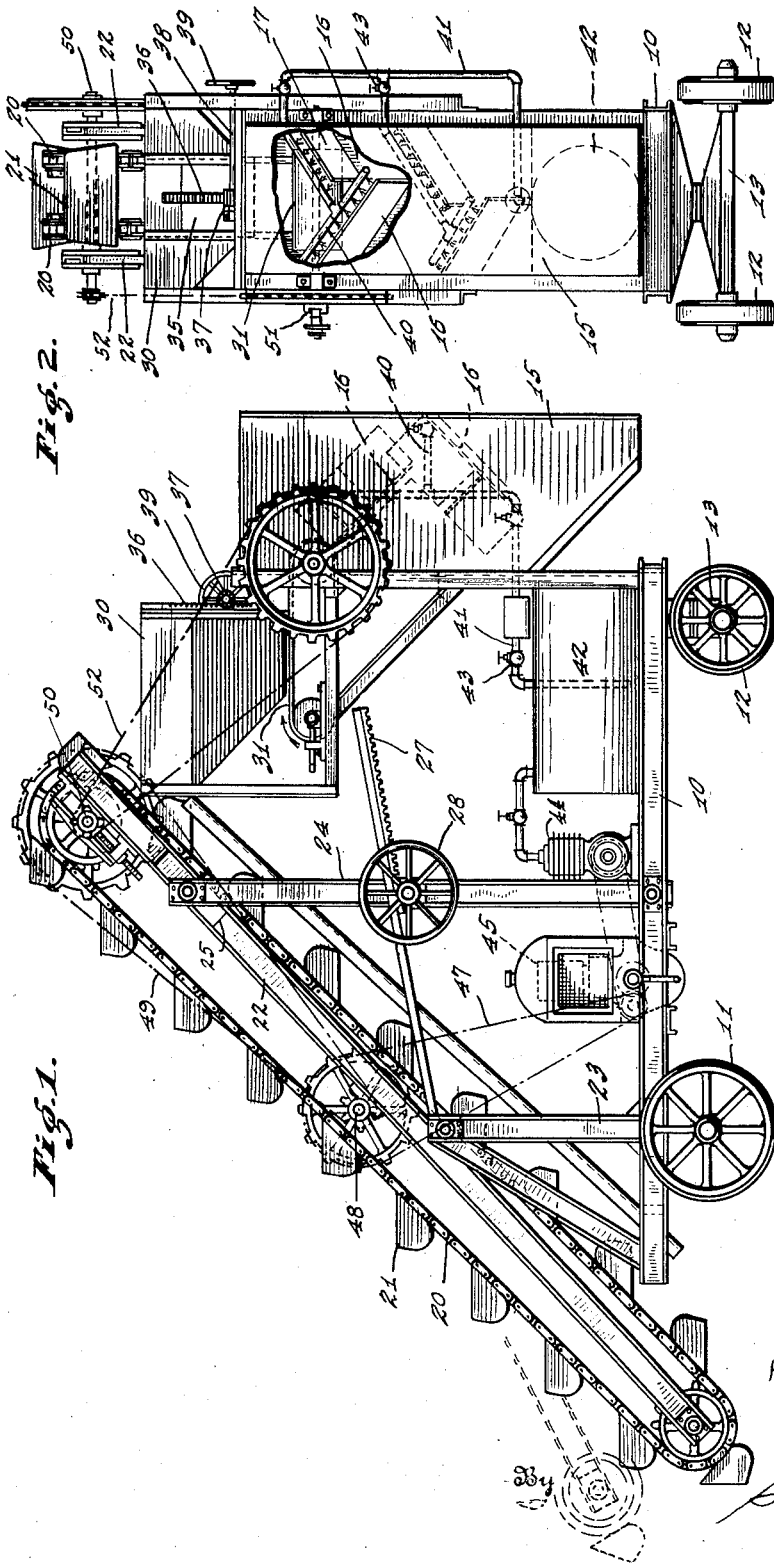
Inventor
KENNETH E. McCONNAUGHAY,
By
Attorneys

UNITED STATES PATENT OFFICE 1,959,002

APPARATUS FOR PRODUCING PAVING MATERIAL

Kenneth E. McConnaughay, Indianapolis, Ind., assignor to Pre Cote Corporation, Indianapolis, Ind., a corporation of Indiana Application December 26, 1930, Serial No. 504,741

2 Claims. (Cl. 94—41)

It is the object of my invention to produce a machine for the preparation of a bituminous paving material. More specifically, it is my object to produce such a machine which can be used in a variety of situations, which will be of simple construction, and which will produce bituminous paving material at a low cost and with a low consumption of power.

In carrying out my invention I provide a frame on which is mounted a chute having a plurality of baffles so arranged that material traveling through the chute is caused to follow a tortuous path. If desired, the frame may be provided with wheels. I mount on the frame a conveyor by means of which aggregate may be elevated to the upper end of such chute. My machine embodies means for regulating the rate at which aggregate is supplied to the chute, and also embodies means for spraying a bituminous binder or other aggregate-treating material on the aggregate as it passes through the chute, the binder and aggregate being thoroughly intermixed by the action of the baffles as the material passes through the chute.

The accompanying drawing illustrates my invention, Figs. 1 and 2 being side and front elevations respectively of the aggregate-treating machine.

The machine illustrated in the drawing comprises a frame 10 provided on opposite ends with two sets of wheels 11 and 12. One pair of wheels, here shown as the wheels 12, are conveniently mounted on an axle 13 which is pivoted to the frame 10 on a vertical axis in order that the machine may be steered.

A chute 15 is mounted on the frame 10, the chute preferably being arranged so that material may pass through it under the influence of gravity. As illustrated in the drawing, the chute is vertical, but this vertical position is not necessary. The chute is provided with means for retarding the flow of material therethrough, such means conveniently comprising a set of main baffle plates 16 which are oppositely inclined, as is clear from Fig. 1.

Preferably, each of the main baffle plates 16 is provided with one or more supplementary baffle plates 17 which are oppositely inclined and cause material to move back and forth laterally as it passes in a general downward direction along the main baffle plate.

For the purpose of elevating aggregate to the upper end of the chute 15, I have shown an endless conveyor 20 having a series of buckets 21. The conveyor is preferably mounted in such a manner that its lower end may be elevated when the device is to be moved; and for this purpose, I have shown a sub-frame 22 on which the conveyor is mounted, such sub-frame being pivotally mounted in the upper ends of uprights 23 which extend upwardly from the main frame 10 of the machine.

For the purpose of swinging the conveyor about its axis of pivotal mounting to raise and lower its lower end, I may provide a link 24 the lower end of which is pivotally connected to the main frame 10, and the upper end of which is pivotally attached to a block 25 that is slidable along the conveyor sub-frame 22. It will be apparent that the angular position of the conveyor may be changed by swinging the arm 24 about its axis of pivotal attachment to the main frame 10. For the purpose of adjusting the link 24, and through it the position of the conveyor, I may mount at an intermediate point of the link 24 a rotatable pinion which meshes with a rack 27 pivotally mounted at one end on one of the uprights 23. A hand-wheel 28 is conveniently provided for rotation of such pinion.

At the upper end of the conveyor 20, I mount a hopper 30, for receiving the aggregate as it is dumped from the buckets 21. The bottom of the hopper is formed, in part at least, by the upper stretch of a belt conveyor 31 which, moving horizontally, carries aggregate from the hopper 30 to the upper end of the chute 15 where it is discharged on to the upper one of the main baffle plates 16.

The rate at which aggregate is supplied to the chute 15 may be controlled by a gate 35 which regulates the height and therefore the effective size of an opening through which aggregate is carried from the hopper 30 by the action of the conveyor 31. Conveniently, this gate is formed by a vertically slidable member which extends across the opening in the wall of the hopper 31, and defines the upper edge of such opening. A rack 36 is secured to the gate 35 in position to mesh with a pinion 37 mounted on a shaft 38. A hand wheel 39 on the end of the shaft 38 is provided for the purpose of rotating the shaft and pinion to adjust the vertical position of the gate.

In the chute 15, I mount a series of pipes 40 each of which is provided with a plurality of holes or nozzles through which bituminous binder or other aggregate-treating material may be discharged on to the aggregate passing through the chute. Preferably, the pipes 40 are respectively arranged parallel to and slightly above the supplementary baffle plates or blades 17 in order to discharge the binder on to the aggregate as it passes along such baffle plates.

The binder may be supplied to the pipes 40 through a pipe 41 which leads from a supply tank 42. A valve 43 in the pipe 41 may be used to regulate the supply of binder to the pipes 40.

Various means may be employed for causing the binder to flow from the tank 42 to the binder-discharge pipes 40. In the drawing, I have illustrated such means as comprising an air compressor 44 which builds up within the tank 42 sufficient pressure to force the binder through the pipe 41 to the spray-pipes 40.

The various moving parts of the machine may all be driven from a common source of power, shown in the drawing as an internal combustion engine 45. As shown in the drawing, the engine 45 is operatively connected through a chain-drive 47 to a cross-shaft 48 mounted on the conveyor sub-frame 22. The cross-shaft 48 is in turn operatively connected through a chain 49 to a shaft 50 mounted at the upper end of the sub-frame 22 and carrying the sprockets which move the bucket-conveyor 20. The belt-conveyor 31, which carries aggregate from the bin 30 to the chute 15, may be driven through a chain drive 52 from the shaft 50. The drives for the two conveyors 20 and 31 may respectively include controlling means such as the clutch 51 shown in connection with the drive for the conveyor 31.

In the full-line position illustrated in Fig. 1, the lower end of the conveyor 20 is disposed adjacent the surface on which the wheels 11 and 12 rest. In this position, the conveyor is adapted to pick up aggregate from such surface and to elevate it into the hopper 30, the conveyor being driven from the engine 45. The aggregate in the hopper 30 is carried therefrom by the belt-conveyor 31 and discharged into the upper end of the chute 15, the rate at which aggregate is so discharged being regulated by the position of the gate 35. As the aggregate falls through the chute over the blades, it is sprayed with binder or other liquid aggregate-treating material discharged from the pipes 40. The blades or baffles 16 and 17 act to tumble the aggregate as it passes through the chute, thus causing the aggregate and the liquid sprayed upon it to become thoroughly intermixed. It is to be noted that the mixing is performed without the expenditure of power, as aggregate passes through the chute 15 under the influence of gravity.

When it is desired to transport the machine from one location to another, it is usually desirable, if not necessary, to elevate the lower end of the conveyor in order to prevent damage thereto. As above set forth, this elevation of the conveyor is secured by rotation of the hand wheel 28 which causes the conveyor to be swung until its lower end occupies approximately the position illustrated in Fig. 1 in dotted lines in which position it will not interfere with transportation of the machine.

I claim as my invention:

1. In a device for coating aggregate with a liquid binder, a pair of vertically spaced oppositely inclined plates, the upper plate being arranged to discharge on to the lower plate, a plurality of baffles extending part way across the upper face of each of said plates, adjacent baffles being oppositely inclined, and means for spraying binder upon aggregate passing over said plates.

2. In a device for coating aggregate with a liquid binder, a generally vertical housing having side walls, a pair of vertically spaced oppositely inclined plates extending across the interior of said housing, the upper of said plates being arranged to discharge on to the lower plate, a pair of baffles associated with each of said plates, one of said baffles extending diagonally inwardly from one side wall of said housing, and the other baffle extending diagonally inwardly from the opposite side wall of said housing, each baffle extending inwardly beyond the inner end of the other and the two baffles being oppositely inclined, and means for spraying liquid binder upon aggregate passing across said plate.

KENNETH E. McCONNAUGHAY.